US005250108A

United States Patent [19]

Tanaka et al.

[11] Patent Number: 5,250,108

[45] Date of Patent: Oct. 5, 1993

[54] COLOR DEVELOPER COMPOSITION, PROCESS FOR PREPARING AQUEOUS DISPERSION THEREOF AND PRESSURE SENSITIVE MANIFOLD SHEET USING THEREOF

[75] Inventors: Masato Tanaka, Nishinomiya; Tomoharu Shiozaki, Amagasaki; Shigeru Oda; Toranosuke Saito, both of Ibaraki, all of Japan

[73] Assignees: Kanzaki Paper Manufacturing Co. Ltd., Tokyo; Sanko Kaihatsu Kagaku Kenkyusho, Osaka, both of Japan

[21] Appl. No.: 679,690

[22] Filed: Apr. 1, 1991

[30] Foreign Application Priority Data

Mar. 30, 1990 [JP] Japan .................................. 2-86684
Jul. 31, 1990 [JP] Japan .................................. 2-204677
Dec. 27, 1990 [JP] Japan .................................. 2-408342

[51] Int. Cl.[5] .............................................. C09D 11/00

[52] U.S. Cl. ............................... 106/21 A; 106/21 R; 503/216

[58] Field of Search ..................... 106/21, 21 R, 21 A; 503/216

[56] References Cited

U.S. PATENT DOCUMENTS 4,623,391 11/1986 Seitz ........................................ 106/21
4,918,047 4/1990 Ikeda et al. ......................... 427/150
4,920,091 4/1990 Iwakura et al. ..................... 427/150
4,921,535 5/1990 Nachbur et al. ...................... 106/21
4,981,836 1/1991 Yamagihara et al. .............. 427/151

FOREIGN PATENT DOCUMENTS 0275107 7/1988 European Pat. Off. .
0318941 6/1989 European Pat. Off. .
0428994A1 5/1991 European Pat. Off. .

*Primary Examiner*—Helene Klemanski
*Attorney, Agent, or Firm*—Armstrong, Westerman, Hattori, McLeland & Naughton

[57] ABSTRACT

The present invention provides a color developer composition characterized in that the composition contains a color developer comprising as its main component a nucleus-substituted salicylic acid salt represented by the formula (1) given below, and at least one amide compound selected from the group consisting of the compounds of represented by the formula (2) and formula (3) given below.

Formula (1)

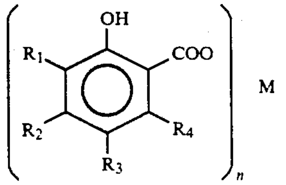

Formula (2)

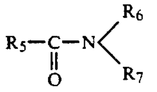

Formula (3)

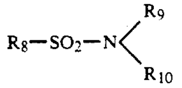

wherein $R_1$ to $R_{10}$ are as defined in the specification.

9 Claims, No Drawings

COLOR DEVELOPER COMPOSITION, PROCESS FOR PREPARING AQUEOUS DISPERSION THEREOF AND PRESSURE SENSITIVE MANIFOLD SHEET USING THEREOF

The present invention relates to a color developer composition, a process for preparing an aqueous dispersion thereof, and pressure sensitive manifold sheet having an excellent initial color forming property and comprising a substrate having applied thereto a coating composition containing the composition or the dispersion.

A pressure sensitive manifold sheet includes various sheets such as a top sheet, middle sheet and under sheet. The top sheet comprises a substrate coated over one surface thereof with a composition which comprises as its main component microcapsules having enclosed therein an oily substance in the form of an oily solution of electron-donating organic chromogenic material (hereinafter referred to simply as the "color former"). The middle sheet comprises a substrate coated over one surface thereof with a composition consisting essentially of an electron-accepting color developer ( hereinafter referred to simply as the "color developer") which forms a color upon contact with the color former, the other surface of the substrate being coated with the color former enclosing capsule composition. The bottom sheet comprises a substrate coated with the color developer composition over one surface thereof. Generally such sheets are used for copying in the combination of top sheet and under sheet, or of top sheet, middle sheet and under sheet as arranged in this order. Another type of pressure sensitive manifold sheet is also known as the self-contained type which comprises a substrate coated with the color former and the color developer over one surface thereof.

Already known as color developers for these pressure sensitive manifold sheets are inorganic color developers such as acid clay, activated clay, attapulgite, zeolite, bentonite, silica, aluminum silicate and the like, and organic color developers such as phenol-aldehyde polymers, phenol-acetylene polymers and like phenol polymers, polyvalent metal salts of aromatic carboxylic acids or derivatives thereof, and the like.

Among these, organic color developers have higher ability to produce a color than inorganic color developers and have another advantage in that the color images obtained do not decrease in density, for example, even if water adheres thereto or when preserved in the same manner as usual filing. However, they have the drawback of forming a color which is low in density immediately after printing and requires a period of time to reach the saturated density (the drawback of being low in initial color forming property). It is therefore desired to remedy the drawback. To overcome the drawback, accordingly, it has been conventional practice to lower the viscosity of the oily substance for dissolving the color former to expedite the contact between the color former and the color developer, whereas since the viscosity of the oily substance increases under low-temperature conditions, this method fails to achieve a satisfactory result.

An object of the present invention is to provide a color developer composition suitable for pressure sensitive manifold sheet having an excellent initial color forming ability, a process for preparing an aqueous dispersion of the color developer composition, and pressure sensitive manifold sheet comprising a substrate coated with a coating composition containing the composition or the dispersion.

The above and other objects of the invention will become apparent from the following description.

The present invention provides a color developer composition characterized in that the composition contains a color developer comprising as its main component a nucleus-substituted salicylic acid salt represented by the formula (1) given below, and at least one amide compound selected from the group consisting of the compounds of the formula (2) and formula (3) given below.

Formula (1)

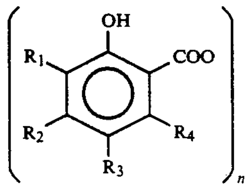

wherein $R_1$, $R_2$, $R_3$ and $R_4$ are each a hydrogen atom, halogen atom, alkyl having 1 to 15 carbon atoms, cycloalkyl, phenyl, nucleus substituted phenyl, aralkyl or nucleus-substituted aralkyl, two of $R_1$, $R_2$, $R_3$ and $R_4$ adjacent to each other may be combined to form a ring, n is an integer of at least 1, and M is a polyvalent metal atom, Formula (2)

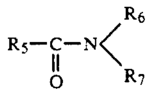

wherein $R_5$ is a hydrogen atom, substituted or unsubstituted alkyl, cycloalkyl, substituted or unsubstituted phenyl, alkenyl, or substituted or unsubstituted aralkyl, $R_6$ and $R_7$ are same or different and are a hydrogen atom, substituted or unsubstituted alkyl, cycloalkyl, substituted or unsubstituted phenyl, alkenyl, or substituted or unsubstituted aralkyl, $R_6$ and $R_7$ may form a morpholine ring, Formula (3)

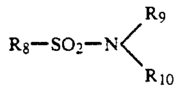

wherein $R_8$, is lower alkyl, or substituted or unsubstituted aryl, $R_9$ and $R_{10}$ are each a hydrogen atom, substituted or unsubstituted alkyl having 1 to 12 carbon atoms, or cycloalkyl, and $R_9$ and $R_{10}$ may form a morpholine ring or piperidine ring.

The present invention also provides a process for preparing an aqueous dispersion of color developer composition characterized by dissolving a color developer comprising as its main component a nucleus-substituted salicylic acid salt represented by the above formula (1), and at least one amide compound selected 1rom the group consisting o1 the compounds of the formula (2) and formula (3) in an organic solvent, emulsifying and dispersing the resulting solution in an aqueous medium with or without heating, and removing the organic solvent from the dispersion by distillation with heating.

The present invention further provides a pressure sensitive manifold sheet characterized in that the sheet comprises a substrate having applied thereto a coating composition containing the above color developer composition or the aqueous dispersion of color developer composition.

Although research has yet to be made to fully clarify the reason why pressure sensitive manifold sheet of excellent initial color forming property can be obtained according to the present invention, the excellent property appears attributable to the chelation of the lone pair electrons of the nitrogen atom in the compound of the formulas (2) and (3) with the metal atom of the nucleus-substituted salicylic acid salt, whereby the crystal structure of the acid salt is partly rendered amorphous. Presumably, this gives the substituted salicylic acid salt improved solubility in the oily substance containing the color former to afford pressure sensitive manifold sheet which is very excellent in initial color forming property.

The substituted salicylic acid salts represented by the formula (1) are all excellent in color developing ability. Typical examples of such salts are polyvalent metal salts of the following salicylic acids.

3-Methyl-5-isononylsalicylic acid, 3-methyl-5-isododecylsalicylic acid, 3-methyl-5-isopentadecylsalicylic acid, 3-methyl-5-(α-methylbenzyl)salicyclic acid, 3-methyl-5-(α, α-dimethylbenzyl)salicylic acid, 3,5-di-sec-butylsalicylic acid, 3,5-di-tert-butyl-6 methylsalicylic acid, 3-tert-butyl-5-phenylsalicylic acid, 3,5-di-tert-amylsalicylic acid, 3-cyclohexyl-5-isononylsalicylic acid. 3-phenyl-5-isononylsalicylic acid, 3-(c -methylbenzyl)-5-isononylsalicylic acid, 3-isopropyl-5-isononylsalicylic acid, 3-isononylsalicylic acid, 3-isononyl-5-methylsalicylic acid, 3-isononyl-5-cyclohexylsalicylic acid, 3-isononyl-5-phenylsalicylic acid, 3-isononyl-5-(α-methylbenzyl)salicylic acid. 3-isononyl-5-(α,4-dimethylbenzyl)salicylic acid, 3-isononyl-5-(α, α-dimethylbenzyl)salicylic acid, 3-(α,α-dimethylbenzyl)-5-isononylsalicylic acid, 3-isononyl-6-methylsalicylic acid. 5-isononylsalicylic acid, 3-tert-butyl-5-isononylsalicylic acid, 3,5-diisononylsalicylic acid, 3-isododecylsalicylic acid, 3-isododecyl-5-methylsalicylic acid, 3-isododecyl-6-methylsalicylic acid, 3-isopropyl-5-isododecylsalicylic acid, 3-isododecyl-5-ethylsalicylic acid, 5isododecylsalicylic acid, 3-isopentadecylsalicylic acid, 3-isopentadecyl-5-methylsalicylic acid, 3-isopentadecyl-6methylsalicylic acid, 5-isopentadecylsalicylic acid, 3,5dicyclohexylsalicylic acid, 3-cyclohexyl-5-(α-methylbenzyl)salicylic acid, 3-phenyl-5-(α-methylbenzyl)salicylic acid, 3-phenyl-5-(α,α-dimethylbenzyl)salicylic acid, 3-(α-methylbenzyl)salicylic acid, 3-(α-methylbenzyl)-5-methylsalicylic acid, 3-(α-methylbenzyl)-6-methylsalicylic acid, 3-(α-methylbenzyl)-5-phenylsalicylic acid, 3,5-di(α-methylbenzyl)salicylic acid, 3-(α-methylbenzyl)-5-(α,α-dimethylbenzyl)salicylic acid, 3-(α-methylbenzyl)-5-bromosalicylic acid, 3-(α,4-dimethylbenzyl)-5-methylsalicylic acid, 3,5-di(α,4-dimethylbenzyl)salicylic acid, 3-(α,α-dimethylbenzyl)-5-methylsalicylic acid, 3-(α,α-dimethylbenzyl)-6-methylsalicylic acid, 3,5-di(α,α-dimethylbenzyl)salicylic acid, 5-(4-mesitylmethylbenzyl)salicylic acid, benzylated styrenated salicylic acid, pinenated salicylic acid, 2-hydroxy-3-(α,α-dimethylbenzyl)-1-naphthoic acid, 3-hydroxy-7-(α,α-dimethylbenzyl)-2-naphthoic acid, etc.

Examples of useful polyvalvent metals are magnesium, calcium, zinc, aluminum, iron, cobalt, nickel and the like, of which zinc is the most preferable. The substituted salicylic acid salts given above may be used singly or in admixture. According to the present invention, the terms isononyl, isododecyl and isopentadecyl groups refer collectively to the substituents resulting from the addition of propylene trimers, propylene tetramers or 1-butene trimers, and propylene pentamers, respectively.

The substituted salicylic acid salts of the formula (1) wherein at least one of $R_1$ and $R_3$, is isononyl, isododecyl or isopentadecyl have the characteristics of being less likely to exhibit lower color developing ability even when the pressure sensitive manifold sheet is exposed to sunlight. These substituted salicylic acid salts include those which are crystalline singly and differ in softening point. Accordingly a color developer which is noncrystalline and having the desired softening point can be prepared by mixing some of these salts in a suitable combination to give the desired properties.

Incidentally, if the color developer has too low a softening point, the color developer to be applied to the surface of paper and dried will penetrate and migrate into interstices between sheet fibers to result in a lower color density, or the aqueous dispersion of the color developer is Prone to solidify to exhibit poor stability when stored for a long period of time. It is therefore desired that the color developer be at least 20° C. in softening point. However, when having an exceedingly high softening point, the color developer almost fails to adhere to the surface of sheet by itself when applied thereto and dried, with the result that a large amount of binder needs to be used for fixing the color developer to the sheet surface. The binder then forms a film, which is likely to impede the migration of the color former dissolving oil which is present in the microcapsules. Thus, the color developer will exhibit slightly impaired color developing ability. Accordingly, it is more desirable to adjust the softening point of the color developer to about 30° to about 85° C.

Color developers as adjusted to the desired softening point can be prepared, first, by mixing together color developers of different softening points, and second, by adding to a color developer a substance for lowering the softening point, such as a metal salt of fatty acid, trialkylphenol, triaralkylphenol, styrene oligomer or the like, so as to lower the softening point of the developer. A third method is to add to a color developer having too low a softening point a substance for increasing the softening point, such as polystyrene, poly-α-methylstyrene, petroleum resin or the like. The mixing ratio is not limited specifically. The term "softening point" as used herein refers to a softening temperature at which the color developer has an equilibrated water content in water and which is usually about 50° C. lower than the softening point of the color developer in a dry state.

According to the present invention, at least one amide compound selected from the group consisting of the compounds of the formula (2) and formula (3) is used in combination with a color developer which comprises the aboveidentified substituted salicylic acid salt as its main component. Examples of amide compounds of the formula (2) are given below. However useful compounds are not limited to these examples. At least two of them are usable in combination.

N,N-Di(2-ethylhexyl)formamide, N,N-dicyclohexylformamide, N,N-diphenylformamide, N,N-dibutylacetamide, N,N-dioctylacetamide, N,N-di(2-ethylhexyl)acetamide, N-[3-(2-ethylhexyloxy)propyl-]acetamide, N,N-dicyclohexylacetamide, N,N-diphenylacetamide, N,N-dibenzylacetamide, N,N-di(-2ethylhexyl)propionamide, N,N-dicyclohexylpropionamide, N,N-diethylcaprylamide, N,N-dibutylcaprylamide, N,N-di(2ethylhexyl)caprylamide, N,N-dicyclohexylcaprylamide, N,N-dimethyllauroylamide, N,N-diethyllauroylamide, N,N-dibutyllauroylamide, N-(2-ethylhexyl)lauroylamide, N,N-di(2-ethylhexyl)-lauroylamide, N-laurylIauroylamide, N,N-diallyl-lauroylamide, N,N-dicyclohexyllauroylamide, N,N-dimethylmyristoylamide, N,N-diethylmyristoylamide, palmitoylamide, N,N-dimethylpalmitoylamide, N,N-diethylpalmitoylamide. stearoylamide, N,N-dimethyl-stearoylamide N,N-diethylstearoylamide, oleoylamide, N,N-dimethyloleoylamide, N,N-diethyloleoylamide, N,N-dibutyloleoylamide, N,N-dibutylphenoxyacetamide, N,N-di(2-ethylhexyl)phenoxyacetamide, N,N-dibutylphenylacetamide, N,N-di(2-ethylhexyl)-phenylacetamide, N,N-di(2-ethylhexyl)cyclohexamide, N,N-diethylbenzamide, lauroylmorpholide, caprylmorpholide, oleoylmorpholide, etc. Among these amide compounds, preferable are di-substituted amide compounds of the formula (2) wherein $R_5$ is alkyl having 1 to 17 carbon atoms or alkenyl having 2 to 17 carbon atoms, and $R_6$ and $R_7$ are each alkyl having 1 to 8 carbon atoms or cyclohexyl, and most preferable are N,N-di(2-ethylhexyl)acetamide, N,N-dicyclohexylacetamide, N,N-diethyllauroylamide, N,N-dibutyllauroylamide, N,N-dimethyloleoylamide, N,N-diethyloleoylamide and N,N-dibutyloleoylamide, which effectively afford the contemplated effect of the present invention.

Examples of sulfonamide compounds of the formula (3) are given below. However useful compounds are not limited to these examples. At least two of them are usable in combination.

N,N-Dioctylmethanesulfonamide, N,N-dicyclohexylmethanesulfonamide, N,N-dioctylethanesulfonamide, benzenesulfonamide, N-methylbenzenesulfonamide, N,N-dimethylbenzenesulfonamide, N-ethylbenzenesulfonamide, N,N-diethylbenzenesulfonamide, N-butylbenzenesulfonamide, N,N-dibutylbenzenesulfonamide, N-octylbenzenesulfonamide, N,N-dioctylbenzenesulfonamide, N-dodecylbenzenesulfonamide, N,N-dicyclohexylbenzenesulfonamide, toluenesulfonamide, N-methyltoluenesulfonamide, N,N-dimethyltoluenesulfonamide, N-ethyltoluenesulfonamide, N,N-diethyltoluenesulfonamide, N-butyltoluenesulfonamide, N,N-dibutyltoluenesulfonamide, N-octyltoluenesulfonamide, N,N-dioctyltoluenesulfonamide, N-dodecyltoluenesulfonamide, N-(2-hydroxyethyl)toluenesulfonamide. N-(3-methoxypropyl)toluenesulfonamide. N-(3-ethoxypropyl)toluenesulfonamide, N-(3-octoxypropyl)-toluenesulfonamide, N-(toluenesulfonyl)morpholine, N-(benzenesulfonyl)piperidine, xylenesulfonamide, N,N-dimethylxylenesulfonamide. N,N-diethylxylenesulfonamide, N,N-dibutylxylenesulfonamide, N-octylxylenesulfonamide, chlorobenzenesulfonamide, N,N-diethylchlorobenzenesulfonamide, N,N-dibutylchlorobenzene-sulfonamide, N,N-dimethylbiphenylsulfonamide, N,N-diethyl-biphenylsulfonamide, etc.

Among these sulfonamide compounds of the formula (3), most preferable to use in advantageously achieving the contemplated effect of the present invention are N,N-dibutyltoluenesulfonamide, N,N-dioctylbenzenesulfonamide, N,N-dioctylmethanesulfonamide, N-octylxylenesulfonamide and N-(toluenesulfonyl)morpholine.

When the compound represented by the formula (2) or (3) is used in a large amount, the color developer sheet obtained for use in pressure sensitive manifold sheet is likely to exhibit an impaired color forming property, or the surface of the color developer layer is likely to become tacky to cause trouble, for example, during printing, so that it is desirable to incorporate into the coating composition 0.05 to 20 parts by weight, more desirably about 0.1 to about 10 parts by weight, of the compound of the formula (2) or (3) per 100 parts by weight of the substituted salicylic acid salt represented by the formula (1) based on dry weight.

In the present invention, the color developer dispersion is prepared preferably by dissolving a color developer of the formula (1) in an organic solvent, and then emulsifying and dispersing the solution in an aqueous medium. The Preferred organic solvent to be used in one having relatively low solubility in water, permitting the color developer to exhibit good solubility therein, and being low in boiling point and less susceptible to chemical changes during preparation of the dispersion. When the compound represented by the formula (Z) or (3) is also dissolved in the organic solvent, the dispersion can be prepared easily, hence an advantage.

Examples of useful organic solvents are benzene, toluene, xylene, chloroform, carbon tetrachloride, trichloroethane, chlorobenzene, methyl ethyl ketone, methyl isobutyl ketone, ethyl acetate, butyl acetate, butanol, amyl alcohol, methyl tertiary butyl ether, etc. While the organic solvent is used in an amount suitably adjusted, for example, in accordance with the size of particles to be dispersed, the amount is preferably up to about 500 parts by weight per 100 parts by weight of the color developer.

The organic solvent solution having the color developer and the compound of the formula (2) or (3) dissolved therein is emulsified and dispersed in an aqueous medium with or without heating. Examples of dispersants for use in this step are anionic surfactants such as alkali salts of alkylsulfates, alkali salts of alkylbenzenesulfonic acids, alkali salts of alkylnaphthalenesulfonic acids, alkali salts of oleic acid amide sulfonic acid and alkali salts of dialkylsulfosuccinic acids, nonionic surfactants such as polyoxyethylene alkyl ethers and polyoxyethylene fatty acid esters, natural high polymer substances such as gum arabic, sodium alginate, agar and gelatin, semi-synthesized high polymer substances such as carboxymethylcellulose. hydroxyethylcellulose, carboxymethylated starch, phosphorylated starch and sodium lignin sulfonate, alkali salts of polymers or copolymers such as methyl vinyl ethermaleic anhydride copolymer, ethylene-maleic anhydride copolymer, styrene-maleic anhydride copolymer, acrylic acid polymer, acrylic acid-methyl methacrylate copolymer, acryclic acid-acrylamide copolymer and vinylbenzenesulfonic acid polymer, synthetic high polymer substances such as polyvinyl alcohol, polyacrylamide and vinyl carboxylate-acrylamide copolymer, etc.

Among these dispersants, vinylcarboxylate-acrylamide copolymer is especially preferable to use in the process of the invention. Most preferably, the acrylamide copolymer is one having a polymerization degree of at least 100 and a copolymerization ratio of 70 to 96 mole % of acrylamide and 4 to 30 mole % of the ester of alkyl or alkoxyalkyl having up to 4 carbon atoms with acrylic acid, methacrylic acid, itaconic acid or maleic acid since the copolymer has a remarkable property of protective colloid and is low in foaming property.

The dispersant is used in an amount suitably adjusted, for example, in accordance with the size of Particles to be dispersed. Preferably, the amount is adjusted to the range of about 1 to about 30 parts by weight per 100 parts by weight of the color developer. At least two dispersants are of course usable in combination.

The color developer aqueous dispersion thus prepared is treated by heating to distill the organic solvent off, whereby an aqueous dispersion of color developer composition is obtained which comprises precisely spherical particles.

The aqueous dispersion obtained may be further subjected to a dispersion treatment. Examples of useful machines for this treatment are various sand mill type pulverizers which employ a pulverizing medium, such as ball mill, pebble mill, sand grinder (vertical or horizontal type), Cobol mill, attritor and Daino mill, three-roll mill, highspeed impeller dispersing machine, high-speed stone mill, high-speed impact mill and like high-speed grinding devices, etc. In view of ease of setting the treating conditions, pulverizing efficiency, etc., it is desirable to use sand mill type pulverizers (vertical or horizontal type) and high-speed impeller dispersing device, among which the sand mill type pulverizers (vertical or horizontal type) are most desirable to use.

The concentration of the color developer in the aqueous dispersion, which is adjusted usually to at least 10 wt.%, can be adjusted to as high as up to about 55 wt.% with the process of the invention. Such a high-concentration dispersion is less costly to transport, permits preparation of coating composition of high concentration, assures a higher drying efficiency in the coating procedure and is expected to give an improved quality to the color developer sheet obtained for use in pressure sensitive manifold sheet.

The coating composition for forming the color developer layer is prepared usually by adding a binder to the aqueous dispersion of color developer composition thus prepared. Examples of useful hinders are starch, casein, gum arabic, carboxymethylcellulose, polyvinyl alcohol, styrene butadiene copolymer latex, vinyl acetate latex and the like. It is also possible to suitably add to the coating composition inorganic pigments such as zinc oxide, magnesium oxide, titanium oxide, aluminum hydroxide, calcium carbonate, magnesium sulfate and calcium sulfate, and various auxiliary agents already known for use in preparing pressure sensitive manifold sheet.

The coating composition thus prepared for forming the color developer layer is applied to a suitable substrate such as wood-free paper, coated paper, synthetic paper or film using a usual coating device such as air knife coater, blade coater, roll coater, size press coater, curtain coater or short-dwell coater, followed by drying to obtain finished pressure sensitive manifold sheet. The amount of coating composition to be applied to the substrate, which is not limited specifically, is adjusted usually to the range of about 2 to about 8 $g/m^2$, based on dry weight.

The color developer composition and the process of the present invention can of course be used for pressure sensitive manifold sheet of the so-called self-contained type having a color developer layer and a color former layer which are formed on the same surface of a substrate or having a single recording layer formed by a coating liquid containing the color developer and an encapsulated color former.

To further clarify the advantages of the present invention, examples and comparative examples are given below, whereas the invention is not limited to the examples. In the examples to follow, the parts and percentages are all by weight unless otherwise specified.

EXAMPLE 1

Preparation of aqueous dispersion of color developer composition

A solution was prepared from 2000 g of water and 400 g of zinc sulfate (heptahydrate) placed into a hollow cylindrical container made of stainless steel, having a capacity of 20000 ml and equipped with a stirrer and a thermometer. To the solution was added 8500 g of 10% aqueous solution of sodium 3,5-di(α-methylbenzyl)salicylate to effect double decomposition while vigorously stirring the solution. The mixture in the container immediately became a thixotropic viscous liquid. Separately, to methyl isobutyl ketone were added 150 g of α-methylstyrene-styrene copolymer (copolymerization ratio: 40:60 in mole %, average molecular weight: about 1500) and 20 g of N,N-dicyclohexylacetamide to obtain 900 g of a solution. Subsequently added within a short period of time to the mixture was 900 g of the methyl isobutyl ketone solution. Upon the thixotropic viscous mixture becoming smoothly flowable, the container was allowed to stand with heating at 75° C. The above procedure produced a lower oily layer separated from an upper aqueous layer, and the lower layer entirely drawn off and placed into a hard glass beaker having a capacity of 5000 ml. To the oily layer were added 600 g of water, 2.5 g of sodium carbonate, 500 g of 5% aqueous solution of polyvinyl alcohol (saponification degree: 98%, polymerization degree: about 1700) and 60 g of 25% aqueous solution of ethyl acrylate-acrylamide copolymer (copolymerization ratio: 13:87 in mole %, polymerization degree: about 400). The mixture was treated by a homomixer (Model M, product of Tokushu Kika Kogyo Co., Ltd.) at 35° to 40° C. at 8800 to 9000 r.p.m. for 20 minutes to obtain an emulsion of the oil-in-water type. The emulsion was placed into a three-necked hard glass flask having a capacity of 10000 ml, equipped with a stirrer and thermometer, and having a distillation opening. With addition of 2000 g of water, the flask was heated while slowly stirring the mixture to boil the mixture. Methyl isobutyl ketone and a portion of water were drawn off through the distillation opening to give an emulsion free from methyl isobutyl ketone and having a total solids content of 38%. The dispersed particles of color developer obtained were 2.0μm in mean particle size, and the dispersion phase was 78° C. in softening point.

Preparation of color developer coating composition

A color developer coating composition was prepared by mixing together 18 parts of the 38% dispersion of color developer composition obtained by the above procedure, 94 parts of calcium carbonate and 100 parts of water, and mixing 50 parts of 10% aqueous solution of polyvinyl alcohol and 10 parts of 50% carboxy-modified SBR latex (SN-307, product of Sumitomo Norgatac Co., Ltd.) with the resulting dispersion.

Preparation of color developer sheet for pressure sensitive manifold paper

The color developer coating composition was applied to one surface of paper weighing 40 g/m$^2$ in an amount of 5 g/m$^2$ by dry weight and dried to obtain a color developer sheet for use in pressure sensitive manifold paper.

EXAMPLE 2

An aqueous dispersion of color developer composition having dispersed therein color developer particles of 1.5 μm in mean size and having a total solids content of 38% was prepared in the same manner as in Example 1 with the exception of using 20 g of N,N-diethyllauroylamide in place of 20 g of N,N-dicyclohexylacetamide. A color developer sheet for pressure sensitive manifold paper was prepared in the same manner as in Example 1 except that this aqueous dispersion was used.

EXAMPLE 3

A color developer sheet for pressure sensitive manifold paper was prepared in the same manner as in Example 1 except that the aqueous dispersion of color developer composition obtained in Example 1 was treated by a sand mill of the horizontal type (Grain mill GMH-S20M, product of Asada Tekko Co., Ltd. at an amount of 3 kg/min. to reduce the particle size of the color developer to a mean particle size of 1.8 μm (total solids content: 38%).

EXAMPLE 4

A color developer sheet for pressure sensitive manifold paper was prepared in the same manner as in Example 2 except that the aqueous dispersion of color developer composition obtained in Example 2 was treated by a sand grinder (Model No. 0SG-8G, product of Igarashi Kikai Co., Ltd.) at an amount of 2 kg/min. to reduce the particle size of the color developer to a mean particle size of 1.4 μm (total solids content: 38% ). Example 5

A 1000 g quantity of zinc 3-isododecylsalicylate and 700 g of toluene were mixed together at 50° C. to obtain a solution, in which 20 g of N,N-diethyllauroylamide was dissolved. The solution was placed into a stainless steel beaker having a capacity of 5000 ml. To the solution were added 600 g of water, 2.5 g of sodium carbonate and 100 g of 25% aqueous solution of ethyl acrylate-acrylamide copolymer (copolymerization ratio: 13:87 in mole % , polymerization degree: about 400). The mixture was treated by a homomixer (Model M, product of Tokushu Kika Kogyo Co., Ltd.) at 35° to 40° C. at 8800 to 9000 r.p.m. for 20 minutes to obtain an emulsion of the oil-in-water type.

The emulsion was placed into a three-necked hard glass flask having a capacity of 10000 ml, equipped with a stirrer and thermometer and formed with a distillation opening. With addition of 2000 g of water, the flask was heated while slowly stirring the mixture to boil the mixture. About 700 g of toluene and about 650 g of water were drawn off through the distillation opening to give an emulsion free from toluene and having a total solids content of 38%. The dispersed particles of color developer obtained were 1.5 μm in mean size, and the dispersion phase was 63° C. in softening point.

The dispersion was then treated by a sand grinder (Model No. 0SG-8G, product of Igarashi Kikai Co., Ltd.) at an amount of 2 kg/min. to reduce the particle size of the color developer to a mean particle size of 1.4 μm.

A color developer sheet for Pressure sensitive manifold paper was prepared in the same manner as in Example 1 with the exception of using this aqueous dispersion of color developer composition.

EXAMPLE 6

A solution was prepared by mixing together 500 g of zinc 3,5-di(α-methylbenzyl)salicylate, 150 g of α-methylstyrene-styrene copolymer (copolymerization ratio: 40:60 in mole %, average molecular weight: about 1500), 350 g of zinc 3-isododecylsalicylate and 700 g of toluene at 50° C., and 20 g of N,N-diethyllauroylamide was dissolved in the toluene solution. The solution was placed into a stainless steel beaker having a capacity of 5000 ml. To the solution were added 600 g of water, 2.5 g of sodium carbonate and 100 g of 25% aqueous solution of ethyl acrylate-acrylamide copolymer (copolymerization ratio: 13:87 in mole %, polymerization degree: about 400). The mixture was treated by a homomixer (Model M, product of Tokushu Kika Kogyo Co., Ltd.) at 35° to 40° C. at 8800 to 9000 r.p.m. for 20 minutes to obtain an emulsion of the oil-in-water type.

The emulsion was placed into a three-necked hard glass flask having a capacity of 10000 ml. equipped with a stirrer and thermometer and formed with a distillation opening. With addition of 2000 g of water, the flask was heated while slowly stirring the mixture to boil the mixture. About 700 g of toluene and about 650 g of water were drawn off through the distillation opening to obtain an emulsion free from toluene and having a total solids content of 38%. The dispersed particles ol color developer obtained were 2.1 μm in mean size, and the dispersion phase was 73° C. in softening point.

A color developer sheet for pressure sensitive manifold paper was prepared in the same manner as in Example 1 with the exception of using this aqueous dispersion of color developer composition.

EXAMPLE 7

An aqueous dispersion of color developer composition having dispersed therein color developer particles of 1.2 μm in mean size and having a total solids content of 38% was prepared in the same manner as in Example 1 with the exception of using 30 g of N,N-dibutyllauroylamide in place of 20 g of N,N-dicyclohexylacetamide. A color developer sheet for pressure sensitive manifold paper was prepared in the same manner as in Example 1 except that this aqueous dispersion was used.

EXAMPLE 8

A color developer sheet for pressure sensitive manifold paper was prepared in the same manner as in Example 7 except that the aqueous dispersion of color developer composition obtained in Example 7 was treated by a sand mill of the horizontal type (Grain mill GMH-S20M, product of Asada Tekko Co., Ltd.) at an amount of 4 kq/min. to reduce the particle size of the color developer to a mean particle size of 1.0 μm (total solids content: 38%).

EXAMPLE 9

An aqueous dispersion of color developer composition having dispersed therein color developer particles of 1.4 μm in mean size and having a total solids content of 38% was prepared in the same manner as in Example 1 with the exception of using 30 g of N,N-dimethyloleoylamide in place of 20 g of N,N-dicyclohexylacetamide. A color developer sheet for pressure sensitive manifold paper was prepared in the same manner as in Example 1 except that this aqueous dispersion was used.

COMPARATIVE EXAMPLE 1

An aqueous dispersion of color developer composition having dispersed therein color developer particles of 2.4 μm in mean size and having a total solids content of 38% was prepared in the same manner as in Example 1 except that 20 g of N,N-dicyclohexylacetamide was not used. A color developer sheet for pressure sensitive manifold paper was prepared in the same manner as in Example 1 with the exception of using this aqueous dispersion.

COMPARATIVE EXAMPLE 2

An aqueous dispersion of color developer composition having dispersed therein color developer particles of 1.7 μm in mean size and having a total solids content of 38% was prepared in the same manner as in Example 5 except that 20 g of N,N-diethyllauroylamide was not used. A color developer sheet lor pressure sensitive manifold paper was prepared in the same manner as in Example 5 with the exception of using this aqueous dispersion.

COMPARATIVE EXAMPLE 3

An aqueous dispersion of color developer composition having dispersed therein color developer particles of 1.9 μm in mean size and having a total solids content of 38% was prepared in the same manner as in Example 1 with the exception of using 20 g of 2,2'-methylenebis(4-methyl-6-tert-butylphenol) in place of 20 g of N,N-dicyclohexylacetamide.

A color developer sheet for pressure sensitive manifold paper was prepared in the same manner as in Example 1 except that this aqueous dispersion was used.

COMPARATIVE EXAMPLE 4

An aqueous dispersion of color developer composition having dispersed therein color developer particles of 2.9 μm in mean size and having a total solids content of 38% was prepared in the same manner as in Example 1 with the exception of using 20 g of triethylene glycolbis[3-(3-tert-butyl-5-methyl-4-hydroxyphenyl)propionate] in place of 20 g of N,N-dicyclohexylacetamide.

A color developer sheet for pressure sensitive manifold paper was prepared in the same manner as in Example 1 except that this aqueous dispersion was used.

The thirteen color developer sheets thus prepared were tested for quality by the following method. Table 1 shows the results.

Preparation of top sheets

Crystal violet lactone was dissolved in alkylated naphthalene, and the oily solution was encapsulated to obtain a capsule coating composition, which was then applied to one surface of wood-free paper in an amount of 4 g/m$^2$ by dry weight and thereafter dried to obtain top sheets. [Low-temperature color forming test]

The color developer sheets and the top sheets were allowed to stand in an atmosphere of 1° C. for 10 hours. The top sheet was then placed over each color developer sheet with the coating layers opposed to each other, and the sheet assembly was caused to form a color in an atmosphere of 1° C. using a dropping type color forming tester (weight: 150 g, height: 10 cm). The density of color formed was measured 10 seconds and one day after the impression by a Macbeth reflective densitometer.

TABLE 1

| | Low-temp. color forming property | |
|---|---|---|
| | after 10 sec. | after one day |
| Ex. 1 | 0.38 | 0.67 |
| Ex. 2 | 0.39 | 0.67 |
| Ex. 3 | 0.40 | 0.72 |
| Ex. 4 | 0.41 | 0.70 |
| Ex. 5 | 0.33 | 0.69 |
| Ex. 6 | 0.38 | 0.70 |
| Ex. 7 | 0.40 | 0.69 |
| Ex. 8 | 0.43 | 0.72 |
| Ex. 9 | 0.39 | 0.69 |
| Com. Ex. 1 | 0.15 | 0.49 |
| Com. Ex. 2 | 0.18 | 0.57 |
| Com. Ex. 3 | 0.16 | 0.52 |
| Com. Ex. 4 | 0.10 | 0.46 |

EXAMPLE 10

Preparation of aqueous dispersion of color developer composition

A solution was prepared from 2000 q of water and 400 g of zinc sulfate (heptahydrate) placed into a hollow cylindrical container made of stainless steel, having a capacity of 20000 ml and equipped with a stirrer and a thermometer. To the solution was added 8500 g of 10% aqueous solution of sodium 3,5-di(α-methylbenzyl)salicylate to effect double decomposition while vigorously stirring the solution. Separately, to methyl isobutyl ketone were added 150 g of α-methylstyrene-styrene copolymer (copolymerization ratio: 40:60 in mole %, average molecular weight: about 1500) and 30 g of N,N-dioctylbenzenesulfonamide to obtain 900 g of a solution. Subsequently added within a short period of time to the mixture was 900 g of the methyl isobutyl ketone solution. Upon the mixture becoming smoothly flowable, the container was allowed to stand with heating at 75° C.

The above procedure produced a separated lower oily layer, which was entirely drawn off and placed into a hard glass beaker having a capacity of 5000 ml. To the oily layer were added 600 g of water, 2.5 g of sodium carbonate, 500 g of 5% aqueous solution of polyvinyl alcohol (saponification degree: 98%, polymerization degree: about 1700) and 60 g of 25% aqueous solution of ethyl acrylate-acrylamide copolymer (copolymerization ratio: 13:87 in mole %, polymerization degree: about 400). The mixture was treated by a homomixer (Model M, product of Tokushu Kika Kogyo Co., Ltd.) at 35° to 40° C. at 8800 to 9000 r.p.m. for 20 minutes to obtain an emulsion of the oil-in-water type.

The emulsion was placed into a three-necked hard glass flask having a capacity of 10,000 ml, equipped with a stirrer and thermometer, and having a distillation opening. With addition of 2000 g of water, the flask was heated while slowly stirring the mixture to boil the mixture. Methyl isobutyl ketone and a portion of water were drawn off through the distillation opening to give an emulsion free from methyl isobutyl ketone and having a total solids content of 38%. The dispersed particles of color developer obtained were 1.0 μm in mean particle size, and the dispersion phase was 75° C. in softening point.

Preparation of color developer coating composition

A color developer coating composition was prepared by mixing together 27 parts of the 38% aqueous dispersion of color developer composition obtained by the above procedure, 90 parts of calcium carbonate and 100 parts of water, and mixing 50 parts of 10% aqueous solution of polyvinyl alcohol and 10 parts of 50% carboxy-modified SBR latex (SN-307, product of Sumitomo Norgatac Co., Ltd.) with the resulting dispersion.

Preparation of color developer sheet for pressure sensitive manifold paper

The color developer coating composition was applied to one surface of paper weighing 40 $g/m^2$ in an amount of 4 $g/m^2$ by dry weight and dried to obtain a color developer sheet for use in pressure sensitive manifold paper.

EXAMPLE 11

An aqueous dispersion of color developer composition having dispersed therein color developer particles of 1.1 μm in mean size and having a total solids content of 38% was prepared in the same manner as in Example 10 with the exception of using 30 g of N,N-dibutyltoluenesulfonamide in place of 30 g of N,N-dioctylbenzenesulfonamide. A color developer sheet for pressure sensitive manifold paper was prepared in the same manner as in Example 10 except that this aqueous dispersion was used.

EXAMPLE 12

An aqueous dispersion of color developer composition having dispersed therein color developer particles of 1.2 μm in mean size and having a total solids content of 38% was prepared in the same manner as in Example 10 except that 40 g of N,N-dioctylmethanesulfonamide was used in place of 30 g of N,N-dioctylbenzenesulfonamide. A color developer sheet for pressure sensitive manifold paper was prepared in the same manner as in Example 10 with the exception of using this aqueous dispersion.

EXAMPLE 13

An aqueous dispersion of color developer composition having dispersed therein color developer particles of 1.6 μm in mean size and having a total solids content of 38% was prepared in the same manner as in Example 10 except that 30 g of a N-octylxylenesulfonamide was used in place of 30 g of N,N-dioctylbenzenesulfonamide. A color developer sheet for pressure sensitive manifold paper was prepared in the same manner as in Example 10 with the exception of using this aqueous dispersion.

EXAMPLE 14

An aqueous dispersion of color developer composition having dispersed therein color developer particles of 1.1 μm in mean size and having a total solids content of 38% was prepared in the same manner as in Example 10 except that 15 g of N-(p-toluenesulfonyl)morpholine was used in place of 30 g of N,N-dioctylbenzenesulfonamide. A color developer sheet for pressure sensitive manifold paper was prepared in the same manner as in Example 10 with the exception of using this aqueous dispersion.

EXAMPLE 15

A color developer sheet for pressure sensitive manifold paper was prepared in the same manner as in Example 10 except that the aqueous dispersion of color developer composition obtained in Example 10 was treated by a sand mill of the horizontal type (Grain mill GMH-S20M, product of Asada Tekko Co., Ltd.) to reduce the particle size of the color developer to a mean particle size of 0.9 μm.

EXAMPLE 16

A color developer sheet for pressure sensitive manifold paper was prepared in the same manner as in Example 11 except that the aqueous dispersion of color developer composition obtained in Example 11 was treated by a sand grinder (Model No. 0SG-8G, product of Igarashi Kikai Co., Ltd.) to reduce the particle size of the color developer to a mean particle size of 1.0 μm.

EXAMPLE 17

A 1000 g quantity of zinc 3-isododecylsalicylate and 700 g of toluene were mixed together at 50° C. to obtain a solution, in which 20 g of N,N-dioctylbenzenesulfonamide was dissolved. The solution was placed into a stainless steel beaker having a capacity of 5000 ml. To the solution were added 600 g of water, 2.5 g of sodium carbonate and 100 g of 25% aqueous solution of ethyl acrylate-acrylamide copolymer (copolymerization ratio: 13:87 in mole %, polymerization degree: about 400). The mixture was treated by a homomixer (Model M, product of Tokushu Kika Kogyo Co., Ltd.) at 35° to 40° C. at 8800 to 9000 r.p.m. for 20 minutes to obtain an emulsion of the oil-in-water type.

The emulsion was placed into a three-necked hard glass flask having a capacity of 10,000 ml, equipped with a stirrer and thermometer and formed with a distillation opening. With addition of 2000 g of water, the flask was heated while slowly stirring the mixture to boil the mixture. About 700 g of toluene and about 650 g of water were drawn off through the distillation opening to give an emulsion free from toluene and having a total solids content of 38% . The dispersed particles of color developer obtained were 1.4 μm in mean particle size, and the dispersion phase was 63° C. in softening point.

The dispersion was then treated by a sand grinder (Model No. 0SG-8G, product of Igarashi Kikai Co., Ltd.) to reduce the particle size of the color developer to a mean particle size of 1.3 μm. A color developer sheet for pressure sensitive manifold paper was prepared in the same manner as in Example 10 with the exception of using this aqueous dispersion of color developer composition.

EXAMPLE 18

A solution was prepared by mixing together 425 g of zinc 3,5-di(α-methylbenzyl)salicylate, 150 g of α-methylstyrene-styrene copolymer (copolymerization ratio: 40:60 in mole %, average molecular weight: about 1500), 425 g of zinc 3-isododecylsalicylate and 700 g of toluene at 50° C., and 20 g of N-octylxylenesulfonamide was dissolved in the toluene solution. The solution was placed into a stainless steel beaker having a capacity of 5000 ml. To the solution were added 600 g of water, 2.5 g of sodium carbonate and 100 g of 25% aqueous solution of ethyl acrylate-acrylamide copolymer (copolymerization ratio: 13:87 in mole %, polymerization degree: about 400). The mixture was treated by a homomixer (Model M, product of Tokushu Kika Kogyo Co., Ltd.) at 35° to 40° C. at 8800 to 9000 r.p.m. for 20 minutes to obtain an emulsion of the ofl-in-water type.

The emulsion was placed into a three-necked hard glass flask having a capacity of 10000 ml, equipped with a stirrer and thermometer and formed with a distillation opening. With addition of 2000 g of water, the flask was heated while slowly stirring the mixture to boil the mixture. About 700 g of toluene and about 650 g of water were drawn off through the distillation opening to obtain an emulsion free from toluene and having a total solids content of 38% . The dispersed particles of color developer obtained were 1.0 μm in mean particle size, and the dispersion phase was 73% in softening point. A color developer sheet for pressure sensitive manifold paper was prepared in the same manner as in Example 10 with the exception of using this aqueous dispersion of color developer composition.

COMPARATIVE EXAMPLE 5

An aqueous dispersion of color developer composition having dispersed therein color developer particles of 1.2 μm in mean size and having a total solids content of 38% was prepared in the same manner as in Example 10 except that 30 g of N,N-dioctylbenzenesulfonamide was not used. A color developer sheet for pressure sensitive manifold paper was prepared in the same manner as in Example 10 with the exception of using this aqueous dispersion.

COMPARATIVE EXAMPLE 6

An aqueous dispersion of color developer composition having dispersed therein color developer particles of 1.0 μm in mean size and having a total solids content of 38% was prepared in the same manner as in Example 12 except that 40 g of N,N-dioctylmethanesulfonamide was not used. A color developer sheet for pressure sensitive manifold paper was prepared in the same manner as in Example 12 with the exception of using this aqueous dispersion.

COMPARATIVE EXAMPLE 7

An aqueous dispersion of color developer composition having dispersed therein color developer particles of 1.1 μm in mean size and having a total solids content of 38% was prepared in the same manner as in Example 17 except that 20 g of N,N-dioctylbenzenesulfonamide was not used. A color developer sheet for pressure sensitive manifold paper was prepared in the sam manner as in Example 17 with the exception of using this aqueous dispersion.

COMPARATIVE EXAMPLE 8

An aqueous dispersion of color developer composition having dispersed therein color developer particles of 1.1 μm in mean size and having a total solids content of 38% was prepared in the same manner as in Example 18 except that 20 g of N-octylxylenesulfonamide was not used. A color developer sheet for pressure sensitive manifold paper was prepared in the same manner as in Example 18 with the exception of using this aqueous dispersion.

The thirteen color developer sheets thus prepared were tested for quality by the following method. Table 2 shows the results.

Preparation of top sheets

Crystal violet lactone was dissolved in alkylated naphthalene, and the oily solution was encapsulated to obtain a capsule coating composition, which was then applied to one surface of wood-free paper in an amount of 4 g/m$^2$ by dry weight and thereafter dried to obtain top sheets.

Low-temperature color forming test

The color developer sheets and the top sheets were allowed to stand in an atmosphere of 0° C. for 10 hours. The top sheet was then placed over each color developer sheet with the coating layers opposed to each other, and the sheet assembly was caused to form a color in an atmosphere of 0° C. using a dropping type color forming tester (weight: 150 g, height: 15 cm). The density of color formed was measured 10 seconds and one day after the impression by a Macbeth reflective densitometer.

TABLE 2

| | Low-temp. color forming property | |
|---|---|---|
| | after 10 sec. | after one day |
| Ex. 10 | 0.33 | 0.72 |
| Ex. 11 | 0.31 | 0.70 |
| Ex. 12 | 0.35 | 0.73 |
| Ex. 13 | 0.30 | 0.70 |
| Ex. 14 | 0.29 | 0.71 |
| Ex. 15 | 0.35 | 0.72 |
| Ex. 16 | 0.33 | 0.71 |
| Ex. 17 | 0.38 | 0.73 |
| Ex. 18 | 0.35 | 0.72 |
| Com. Ex. 5 | 0.16 | 0.63 |
| Com. Ex. 6 | 0.18 | 0.65 |
| Com. Ex. 7 | 0.19 | 0.67 |
| Com. Ex. 8 | 0.18 | 0.66 |

The results given in Tables 1 and 2 reveal that the color developer sheets each having the color developer composition of the invention incorporated therein for use in pressure sensitive manifold paper were all excellent in low-temperature color forming property, particularly in initial color forming ability.

We claim:

1. A color developer composition characterized in that the composition contains a color developer comprising as its main component a nucleus-substituted salicylic acid salt represented by the formula (1) given below, and at least one amide compound selected from the group consisting of the compounds represented by the formula (2) and formula (3) given below Formula (1)

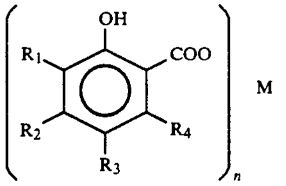

wherein $R_1$, $R_2$, $R_3$ and $R_4$ are each a hydrogen atom, halogen atom, alkyl having 1 to 15 carbon atoms. cycloalkyl, phenyl, nucleussubstituted phenyl, aralkyl or nucleus-substituted aralkyl, two of $R_1$, $R_2$, $R_3$ and $R_4$ adjacent to each other may be combined to form a ring. n is an integer of at least 1, and M is a polyvalent metal atom,

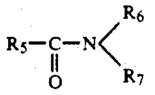

Formula (2)

wherein $R_5$ is alkyl having 1 to 17 carbon atoms or alkenyl having 2 to 17 carbon atoms, $R_6$ and $R_7$ are each alkyl having 1 to 8 carbon atoms or cyclohexyl,

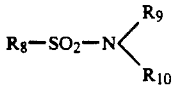

Formula (3)

wherein $R_8$ is lower alkyl, or substituted or unsubstituted aryl, $R_9$ and $R_{10}$ are each a hydrogen atom, substituted or unsubstituted alkyl having 1 to 12 carbon atoms, or cycloalkyl, and $R_9$ and $R_{10}$ may form a morpholine ring or piperidine ring such that the compound of the formula (3) is N,N-dibutyltoluenesulfonamide, N,N-dioctylbenzenesulfonamide, N,N-dioctylmethanesulfonamide, N-oxtylxylenesulfonamide or N-(toluenesulfonyl)morpholine.

2. A color developer composition as defined in claim 1 wherein the compound of the formula (2) is N,N-di(2-ethylhexyl)acetamide, N,N-dicyclohexylacetamide, N,N-diethyllauroylamide, N,N,-dibutyllauroylamide, N,N-dimethyloleoylamide, N,N-diethyloleoylamide or N,N-dibutyloleoylamide.

3. A color developer composition as defined in claim 1 wherein 0.05 to 20 parts by weight of the compound of the formula (2) and/or (3) is used per 100 parts by weight of the substituted salicylic acid salt represented by the formula (1) based on dry weight.

4. A color developer composition as defined in claim 1 wherein at least one of $R_1$ and $R_3$ in the formula (1)is isononyl, isododecyl or isopentadecyl.

5. A color developer composition as defined in claim 1 wherein the softening point of the color developer is at least 20° C.

6. A color developer composition as defined in claim 1 wherein the softening point of the color developer is about 30° to about 85° C.

7. A color developer composition as defined in claim 1 wherein the polyvalent metal is magnesium, calcium, zinc, aluminum, iron, cobalt or nickel.

8. A process for preparing an aqueous dispersion of color developer composition characterized by dissolving a color developer comprising as its main component a nucleus-substituted salicylic acid salt represented by formula (1), and at least one amide compound selected from the group consisting of the compounds of formula ()2) and formula (3) in an organic solvent, emulsifying and dispersing the resulting solution in an aqueous medium with or without heating, and removing the organic solvent from the dispersion by distillation with heating, wherein formulae (1)-(3) are defined as follows:

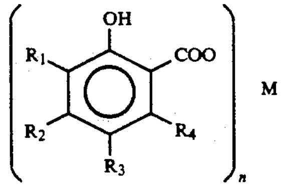

Formula (1)

wherein $R_1$, $R_2$, $R_3$ and $R_4$ are each a hydrogen atom, a halogen atom, alkyl having 1 to 15 carbon atoms, cycloalkyl, phenyl, nucleus-substituted phenyl, aralkyl or nucleus-substituted phenyl, aralkyl or nucleus-substituted aralkyl, two of $R_1$, $R_2$, $R_3$ and $R_4$ adjacent to each other may be combined to form a ring, n is an integer of at least 1, and M is a polyvalent metal atom,

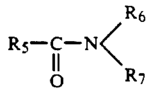

Formula (2)

wherein $R_5$ is alkyl having 1 to 17 carbon atoms or alkenyl having 2 to 17 carbon atoms, $R_6$ and $R_7$ are each alkyl having 1 to 8 carbon atoms or cyclohexyl,

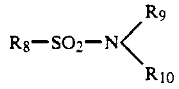

Formula (3)

wherein $R_8$ is lower alkyl, or substituted or unsubstituted aryl, $R_9$ and $R_{10}$ are each a hydrogen atom, substituted or unsubstituted alkyl having 1 to 12 carbon atoms, or cycloalkyl, and $R_9$ and $R_{10}$ may form a morpholine ring or piperidine ring such that the compound of the formula (3) is N,N-dibutyl-toluenesulfonamide, N,N-dioctylbenzenesulfonamide, N,N-dioctylmethanesulfonamide, N-octylxylenesulfonamide or N-(toluenesulfonyl)morpholine.

9. An aqueous dispersion of color developer composition produced by the process of claim 8.

* * * * *